United States Patent
Wen et al.

(10) Patent No.: US 8,973,910 B2
(45) Date of Patent: Mar. 10, 2015

(54) POSITIONING APPARATUS

(75) Inventors: Qing-Song Wen, Shenzhen (CN);
Wei-Feng Pan, Shenzhen (CN);
Jian-Xin Ma, Shenzhen (CN); Yu Lu,
Shenzhen (CN)

(73) Assignees: Fu Tai Industry (Shenzhen) Co., Ltd.,
Shenzhen (CN); **Hon Hai Precision
Industry Co., Ltd.**, New Taipei (TW)

( * ) Notice: Subject to any disclaimer, the term of this patent is extended or adjusted under 35 U.S.C. 154(b) by 746 days.

(21) Appl. No.: 13/216,424

(22) Filed: Aug. 24, 2011

(65) Prior Publication Data
US 2012/0161378 A1    Jun. 28, 2012

(30) Foreign Application Priority Data
Dec. 25, 2010   (CN) .......................... 2010 1 0606809

(51) Int. Cl.
| B23Q 1/64 | (2006.01) |
| B25B 1/22 | (2006.01) |
| B23Q 3/00 | (2006.01) |
| B23Q 3/18 | (2006.01) |
| B23K 31/02 | (2006.01) |
| B23K 37/04 | (2006.01) |
| B23Q 1/48 | (2006.01) |
| B23Q 1/52 | (2006.01) |

(52) U.S. Cl.
CPC . *B23Q 3/18* (2013.01); *B23K 31/02* (2013.01); *B23K 37/04* (2013.01); *B23K 37/0435* (2013.01); *B23Q 1/4852* (2013.01); *B23Q 1/525* (2013.01)

USPC ............................. 269/56; 269/75; 269/289 R

(58) Field of Classification Search
CPC .......... B23K 31/00; B23K 37/00; B23Q 3/00; B23Q 1/00
USPC .............. 269/56, 55, 71, 75, 136–138, 289 R
See application file for complete search history.

(56) References Cited

U.S. PATENT DOCUMENTS 5,400,720 A * 3/1995 Stevens .......................... 108/147

FOREIGN PATENT DOCUMENTS

| CN | 2513612 Y | 10/2002 |
| CN | 201012474 Y | 1/2008 |
| CN | 201446364 U | 5/2010 |

* cited by examiner

*Primary Examiner* — Lee D Wilson
*Assistant Examiner* — Seahee Yoon
(74) *Attorney, Agent, or Firm* — Novak Druce Connolly Bove + Quigg LLP

(57) ABSTRACT

A positioning apparatus includes a base plate and a deflection mechanism mounted upon the base plate. The deflection mechanism includes a stationary platform, a rocker assembly and a deflection platform. The stationary platform is mounted over the base plate for placing and positioning a workpiece. The deflection platform is tiltably mounted over the stationary platform via the rocker assembly and the height of the stationary platform itself is adjustable. The rocker assembly comprises a first rocker and a second rocker of different lengths.

18 Claims, 3 Drawing Sheets

US 8,973,910 B2

POSITIONING APPARATUS

BACKGROUND

1. Technical Field

The present disclosure relates to positioning apparatus and, particularly, to a positioning apparatus used for positioning a workpiece during a mechanical manufacturing process.

2. Description of Related Art

Positioning apparatus are widely applied in many manufacturing fields, such as welding processes, milling processes, and the like, for positioning the workpiece. A commonly used positioning apparatus generally is large in size and has low precision. In use, the workpiece is fixedly placed on the positioning apparatus manually or by a manipulator, the position and angle of the workpiece cannot be adjusted during the manufacturing process, thus, the operator needs to process or handle the workpiece from different directions and angles thereby decreasing the manufacturing efficiency and requiring to have unnecessary widened tolerances in the quality specification of the workpiece.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
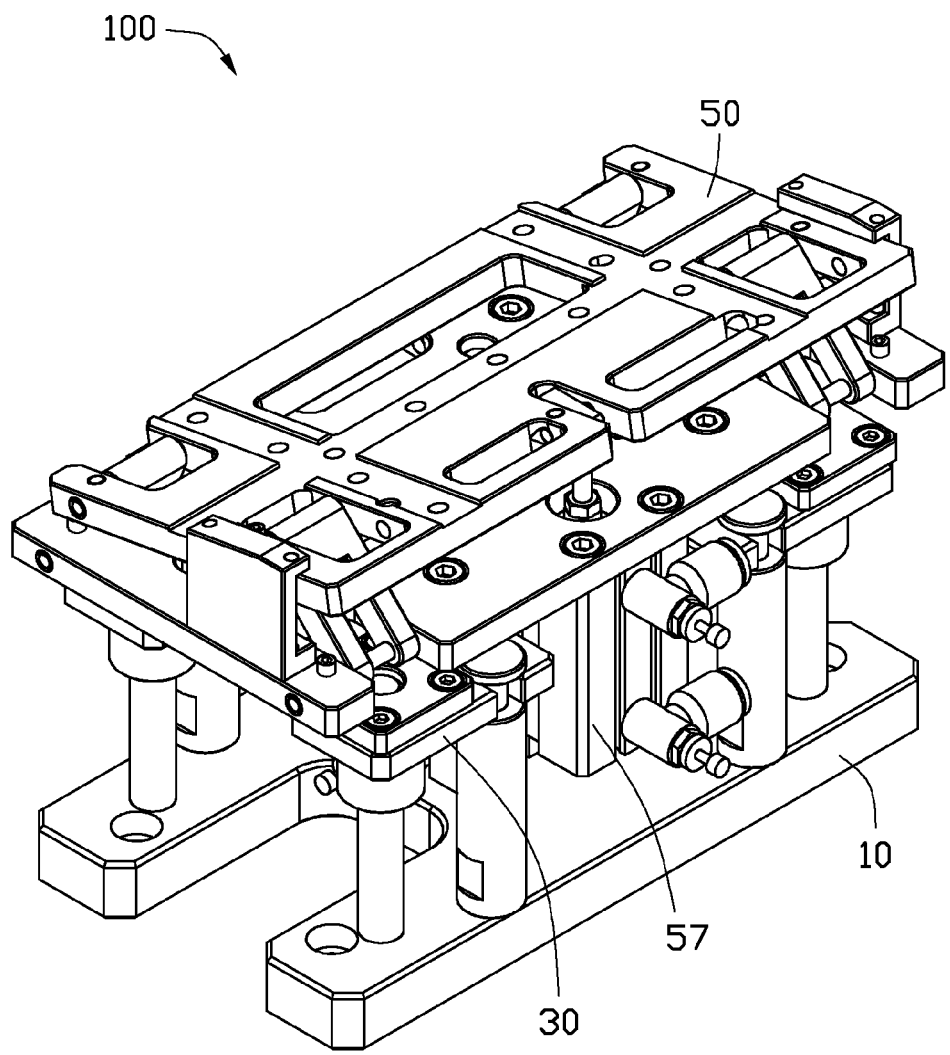
FIG. 1 is an isometric view of an embodiment of an assembled positioning apparatus.
Figure 2:
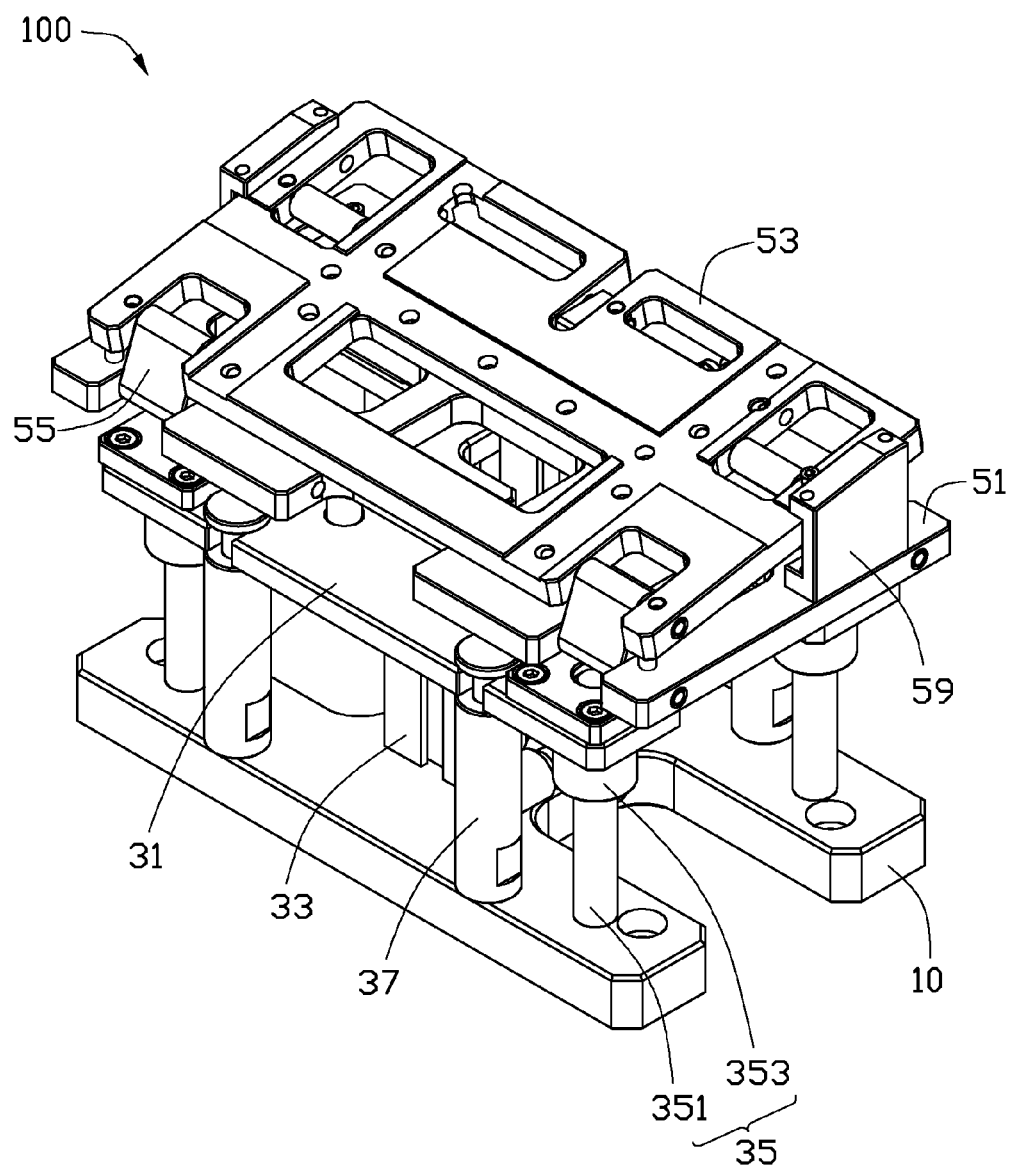
FIG. 2 is similar to FIG. 1, but viewed from another aspect.
Figure 3:
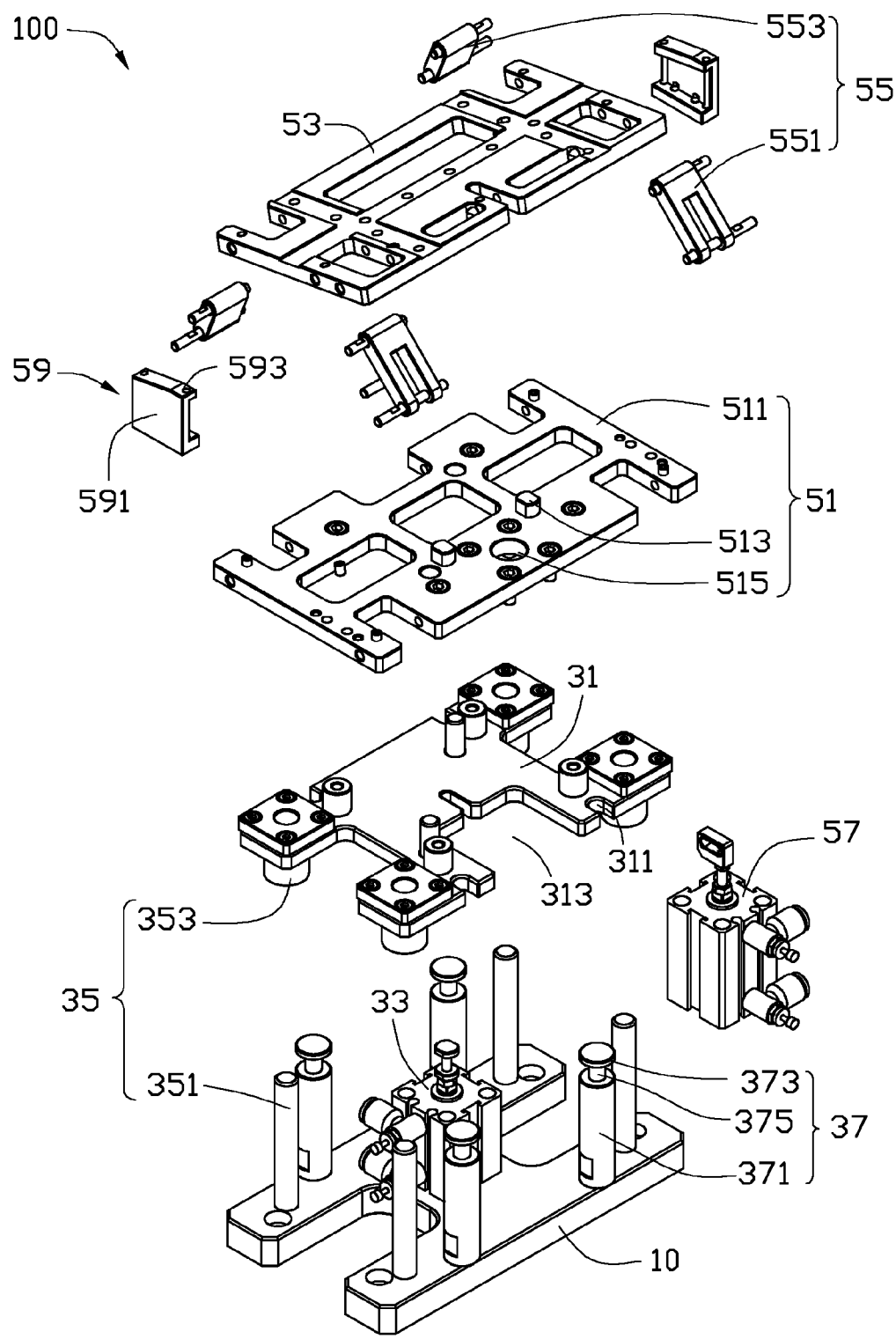
FIG. 3 is an isometric, exploded view of the positioning apparatus of FIG. 1.

Referring to FIGS. 1 through 3, an embodiment of a positioning apparatus 100 is shown for positioning a workpiece (not shown) during a mechanical manufacturing process. The positioning apparatus 100 includes a base plate 10, an elevating mechanism 30, and a deflection mechanism 50 mounted on the elevating mechanism 30. The base plate 10 is a substantially H-shaped plate in the illustrated embodiment, and is configured for supporting the elevating mechanism 30 and the deflection mechanism 50.

The elevating mechanism 30 is mounted on the base plate 10, and positioned under the deflection mechanism 50. The elevating mechanism 30 is connected to the deflection mechanism 50 and is configured for adjusting the height of the deflection mechanism 50 relative to the base plate 10. The elevating mechanism 30 includes an elevating board 31, an elevating driver 33, a guiding assembly 35 and at least one limiting rod 37. The elevating board 31 is mounted over the base plate 10, and above the elevating driver 33, the guiding assembly 35 and the limiting rod 37. The elevating board 31 is capable of being adjusted upward and downward, and is thereby capable of achieving a preset height relative to the base plate 10. In the illustrated embodiment, the elevating board 31 is a substantially H-shaped board. Four limiting slots 311 are oppositely defined through the elevating board 31, and are positioned in pairs adjacent to the two ends of the elevating board 31. An accommodating slot 313 is defined in the middle of one side of the elevating board 31.

The elevating driver 33 is mounted on the base plate 10 and is connected with the elevating board 31 to drive the elevating board 31 upward or downward, thereby adjusting the height of the elevating board 31. The elevating driver 33 can be a hydraulic cylinder, an electric motor, or the like. In the illustrated embodiment, the elevating driver 33 is a hydraulic cylinder.

The guiding assembly 35 is also mounted on the base plate 10 and is connected to the elevating board 31, for guiding the elevating board 31 to move up and down in a strictly perpendicular fashion relative to the base plate 10 and thereby preventing any lateral movement. In the illustrated embodiment, the guiding assembly 35 includes four cylindrical guiding rods 351 and four guiding sleeves 353. The four guiding rods 351 are perpendicularly fixed to the base plate 10, and each guiding rod 351 is positioned adjacent to a corner of the base plate 10. The four guiding sleeves 353 are substantially hollow cylinders, and each guiding sleeve 353 is fixed adjacent to a corner of the elevating board 31. The guiding sleeves 353 form a precise sliding fit on the guiding rods 351, respectively. Thus, the elevating board 31 is capable of sliding upward and downward and maintaining a precise and constant alignment to the base plate 31.

The limiting rod 37 is mounted on the base plate 10 and limits the up and down movement of the elevating board 31. In the illustrated embodiment, there are four limiting rods 37 to engage with the four limiting slots 311 of the elevating board 31. Each limiting rod 37 includes a support portion 371 fixed to the base plate 10, a limiting portion 373 and a connecting portion 375 creating a neck between the support portion 371 and the limiting portion 373. The diameter of the connecting portion 375 is substantially the same as or less than that of the limiting slot 311 of the elevating board 31, such that the connecting portion 375 may slide into the limiting slot 311 of the elevating board 31. The support portion 371 and the limiting portion 373 both have a diameter substantially greater than the width of the limiting slot 311 of the elevating board 31. The support portion 371 and the limiting portion 373 are configured for keeping the elevating board 31 to stay within bounds.

The deflection mechanism 50 includes a stationary platform 51, a deflection platform 53, a rocker assembly 55, a deflection driver 57 and a limiting member 59. The stationary platform 51 is fixed on the elevating board 31, and includes a substantially rectangular base body 511 and two positioning posts 513 formed on the top surface of the base body 511, being equidistant from the ends of the base body 511. A mounting hole 515 is defined through in the middle of one side of the base body 511 of the stationary platform 51, and is arranged above the nominal center point of the accommodating slot 313.

The deflection platform 53 is a substantially rectangular board and is adjustably mounted over the stationary platform 51 via the rocker assembly 55. The deflection platform 53 is used for positioning and securing the workpiece. In one embodiment, the deflection platform 53 may include a holding member, such as a latching arm, a suction disc, and the like for holding the workpiece. In the illustrated embodiment, there are two rocker assemblies 55, one at each end of the stationary platform 51, thereby attaching the stationary platform 51 and the deflection platform 53 together. Each rocker assembly 55 is a bar with a pivot at each end thereof, and includes a first rocker 551 and a second rocker 553, in which one side of the stationary platform 51 supports a pair of the first rockers 551 and the other side of the stationary platform 51 supports a pair of the second rockers 553. The first rocker 551 and the second rocker 553 are of different lengths.

The deflection driver 57 is mounted to the stationary platform 51 and partially accommodated within the corresponding accommodating slot 313 of the elevating board 31. One end of the deflection driver 57 passes through the corresponding mounting hole 515 of the stationary platform 51 and connects with the deflection platform 53, for driving the deflection platform 53 to tilt up or down on one or more lengthwise axis (relative to the stationary platform 51) or axes, to stay within the limits of range of movement defined by the rocker assembly 55. The deflection driver 57 may be a hydraulic cylinder, an electric motor, or the like. In the illustrated embodiment, the deflection driver 57 is a hydraulic cylinder.

In this embodiment, a limiting member 59 is mounted at each end of the deflection platform 53, to impose tilting angle limits for the deflection platform 53 relative to the stationary platform 51. The limiting member 59 includes a main body 591 fixed to the deflection platform 53, and a limiting portion 593 extending from one end of the main body 591.

Also referring to FIGS. 1 and 2, as in use, the workpiece (not shown) is positioned and secured on to the deflection platform 53. The deflection platform 53 together with the workpiece can be driven to lift upward or descend downward until they are finally positioned at a particular (preset if required) height relative to the base plate 10, within the range of movement allowed by the connecting portion 375 to the elevating board 31. Further, the deflection platform 53 and the workpiece can be tilted to any desired (preset if required) angle relative to the stationary platform 51, within the tilting limits set by the limiting members 59.

The stationary platform 51, the two first rockers 551, the deflection platform 53 and the two second rocker 553 cooperatively form a pair of four bar linkage mechanisms, which are lengthwise symmetrical but not laterally symmetrical. The positioning apparatus 100 has a simple structure and is easy to operate. In use, the workpiece is mounted on the deflection platform 53. The deflection platform 53 together with the workpiece can be adjusted to any preset position, and during the entire mechanical manufacturing process, the workpiece needs not be detached from the deflection platform 53.

Although numerous characteristics and advantages of the disclosure have been set forth in the foregoing description, together with details of the structure and function of the embodiment, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A positioning apparatus, comprising:
   a base plate; and
   a deflection mechanism mounted over the base plate, the deflection mechanism comprising:
      a stationary platform mounted over the base plate for placing and positioning a workpiece;
      a rocker assembly;
      a deflection platform tiltably mounted over the stationary platform via the rocker assembly; and
   an elevating mechanism positioned under the deflection mechanism; the elevating mechanism comprising:
      an elevating board mounted over the base plate,
      a guiding assembly mounted on the base plate and connected to the elevating board, configured to guide the elevating board to move up and down relative to the base plate; the guiding assembly comprising:
         four cylindrical guiding rods perpendicularly fixed to the base plate; and
         four guiding sleeves slidably sleeved onto the one guiding rods, respectively;
      wherein, the rocker assembly comprises a first rocker and a second rocker, the first rocker and the second rocker are of different lengths, the first rocker and the second rocker are oppositely rotatably mounted to two sides of the stationary platform, and are further rotatably assembled to two sides of the deflection platform.

2. The positioning apparatus of claim 1, wherein the positioning apparatus further comprises a limiting member mounted to the deflection platform, to impose tilting limits for the deflection platform relative to the stationary platform.

3. The positioning apparatus of claim 2, wherein the limiting member comprises a main body fixed to the deflection platform, and a limiting portion extending from one end of the main body.

4. The positioning apparatus of claim 2, wherein the stationary platform defines a mounting hole adjacent to a side thereof; the positioning apparatus further comprises a deflection driver mounted to the stationary platform and positioned between the base plate and the stationary platform, one end of the deflection driver passes through the corresponding mounting hole of the stationary platform and connects with the deflection platform, for driving the deflection platform to tilt up or down on a lengthwise axis relative to the stationary platform within the limits of range of movement defined by the rocker assembly.

5. The positioning apparatus of claim 4, wherein the deflection driver is a hydraulic cylinder or an electric motor.

6. The positioning apparatus of claim 4, wherein the elevating mechanism is connected to the deflection mechanism and is configured for adjusting the height of the deflection mechanism relative to the base plate.

7. The positioning apparatus of claim 6, wherein the elevating mechanism comprises an elevating driver fixed to the base plate; the elevating board is mounted over the base plate via the elevating driver, and the elevating board is capable of being adjusted upward and downward and is thereby capable of achieving a preset height relative to the base plate.

8. The positioning apparatus of claim 7, wherein each of the guiding rods is positioned adjacent to a corner of the base plate; the four guiding sleeves are substantially hollow cylinders, and each of the guiding sleeves is fixed adjacent to a corner of the elevating board.

9. The positioning apparatus of claim 7, wherein the elevating board defines four limiting slots positioned in pairs adjacent to two ends of the elevating board; the positioning apparatus further comprises four limiting rods mounted on the base plate to engage with the four limiting slots of the elevating board, for limiting the up and down movement of the elevating board.

10. The positioning apparatus of claim 9, wherein each of the limiting rods comprises a support portion fixed to the base plate, a limiting portion and a connecting portion creating a neck between the support portion and the limiting portion; the diameter of the connecting portion is substantially the same as or less than that of the limiting slot of the elevating board; the support portion and the limiting portion both have a diameter substantially greater than the width of the limiting slot of the elevating board for keeping the elevating board to stay within bounds.

11. A positioning apparatus, comprising:
   a base plate;

an elevating mechanism mounted on the base plate; the elevating mechanism comprising:
an elevating board mounted over the base plate,
a guiding assembly mounted on the base plate and connected to the elevating board, configured to guide the elevating board to move up and down relative to the base plate; the guiding assembly comprising:
four cylindrical guiding rods perpendicularly fixed to the base plate; and
four guiding sleeves slidably sleeved onto the one guiding rods, respectively;
a deflection mechanism adjustably mounted on the elevating mechanism, the deflection mechanism comprising:
a stationary platform mounted over the base plate and supported by the elevating mechanism for placing and positioning a workpiece;
a rocker assembly; and
a deflection platform adjustably mounted over the stationary platform via the rocker assembly;
wherein, the rocker assembly comprises a first rocker and a second rocker of different lengths, the first rocker and the second rocker are oppositely rotatably mounted to two sides of the stationary platform, and are further rotatably assembled to two sides of the deflection platform.

12. The positioning apparatus of claim 11, wherein the elevating mechanism comprises an elevating driver fixed to the base plate, the elevating board is mounted over the base plate via the elevating driver, the elevating board is capable of being adjusted upward and downward along a direction perpendicular to the base plate for adjusting the height of the deflection mechanism relative to the base plate.

13. The positioning apparatus of claim 12, wherein each of the guiding rods is positioned adjacent to a corner of the base plate; the four guiding sleeves are substantially hollow cylinders, and each of the guiding sleeves is fixed adjacent to a corner of the elevating board.

14. The positioning apparatus of claim 12, wherein the elevating board defines four limiting slots positioned in pairs adjacent to two ends of the elevating board; the positioning apparatus further comprises four limiting rods mounted on the base plate to engage with the four limiting slots of the elevating board, for limiting the up and down movement of the elevating board; each of the limiting rods comprises a support portion fixed to the base plate, a limiting portion and a connecting portion creating a neck between the support portion and the limiting portion; the diameter of the connecting portion is substantially the same as or less than that of the limiting slot of the elevating board; the support portion and the limiting portion both have a diameter substantially greater than the width of the limiting slot of the elevating board for keeping the elevating board to stay within bounds.

15. The positioning apparatus of claim 12, wherein the positioning apparatus further comprises a limiting member mounted to the deflection platform, to impose tilting limits for the deflection platform relative to the stationary platform.

16. The positioning apparatus of claim 14, wherein the stationary platform defines a mounting hole adjacent to a side thereof; the positioning apparatus further comprises a deflection driver mounted to the stationary platform and positioned between the base plate and the stationary platform, one end of the deflection driver passes through the corresponding mounting hole of the stationary platform and connects with the deflection platform, for driving the deflection platform to tilt up or down on a lengthwise axis relative to the stationary platform within the limits of range of movement defined by the rocker assembly.

17. A positioning apparatus, comprising:
a base plate;
an elevating board mounted over the base plate, the elevating board defining four limiting slots positioned in pairs adjacent to two ends of the elevating board;
four limiting rods mounted on the base plate to engage with the four limiting slots of the elevating board, for limiting the up and down movement of the elevating board; and
a deflection mechanism mounted over the base plate, the deflection mechanism comprising:
a stationary platform mounted over the base plate for placing and positioning a workpiece;
a rocker assembly; and
a deflection platform tiltably mounted over the stationary platform via the rocker assembly;
wherein, the rocker assembly comprises a first rocker and a second rocker, the first rocker and the second rocker are of different lengths, the first rocker and the second rocker are oppositely rotatably mounted to two sides of the stationary platform, and are further rotatably assembled to two sides of the deflection platform.

18. The positioning apparatus of claim 17, wherein each of the limiting rods comprises a support portion fixed to the base plate, a limiting portion and a connecting portion creating a neck between the support portion and the limiting portion; the diameter of the connecting portion is substantially the same as or less than that of the limiting slot of the elevating board; the support portion and the limiting portion both have a diameter substantially greater than the width of the limiting slot of the elevating board for keeping the elevating board to stay within bounds.

* * * * *

UNITED STATES PATENT AND TRADEMARK OFFICE
CERTIFICATE OF CORRECTION

PATENT NO.           : 8,973,910 B2
APPLICATION NO.      : 13/216424
DATED                : March 10, 2015
INVENTOR(S)          : Qing-Song Wen et al.

It is certified that error appears in the above-identified patent and that said Letters Patent is hereby corrected as shown below:

Title Page

Please replace Item (73) regarding "Assignees" on the front page of the Patent with the following:

(73) Assignees: Fu Tai Hua Industry (Shenzhen) Co., Ltd., Shenzhen (CN);
Hon Hai Precision Industry Co., Ltd., New Taipei (TW).

Signed and Sealed this
First Day of December, 2015

Michelle K. Lee
*Director of the United States Patent and Trademark Office*